Figures 1, 5:
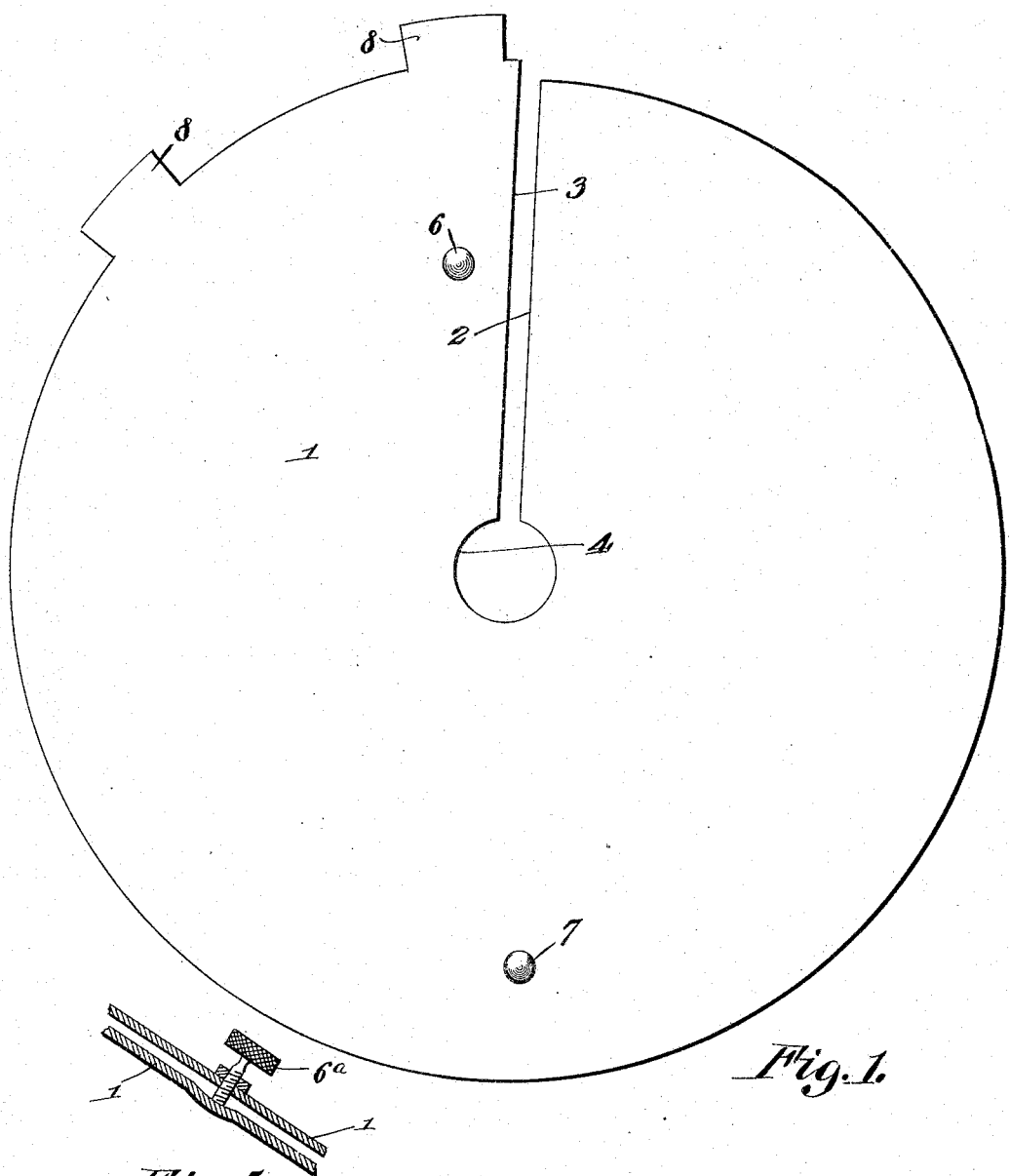

H. ELLIS.
KETTLE COVER.
APPLICATION FILED MAR. 19, 1909.

947,098.

Patented Jan. 18, 1910.
2 SHEETS—SHEET 1.

Witnesses

Inventor
Harry Ellis,
By Victor J. Evans
Attorney

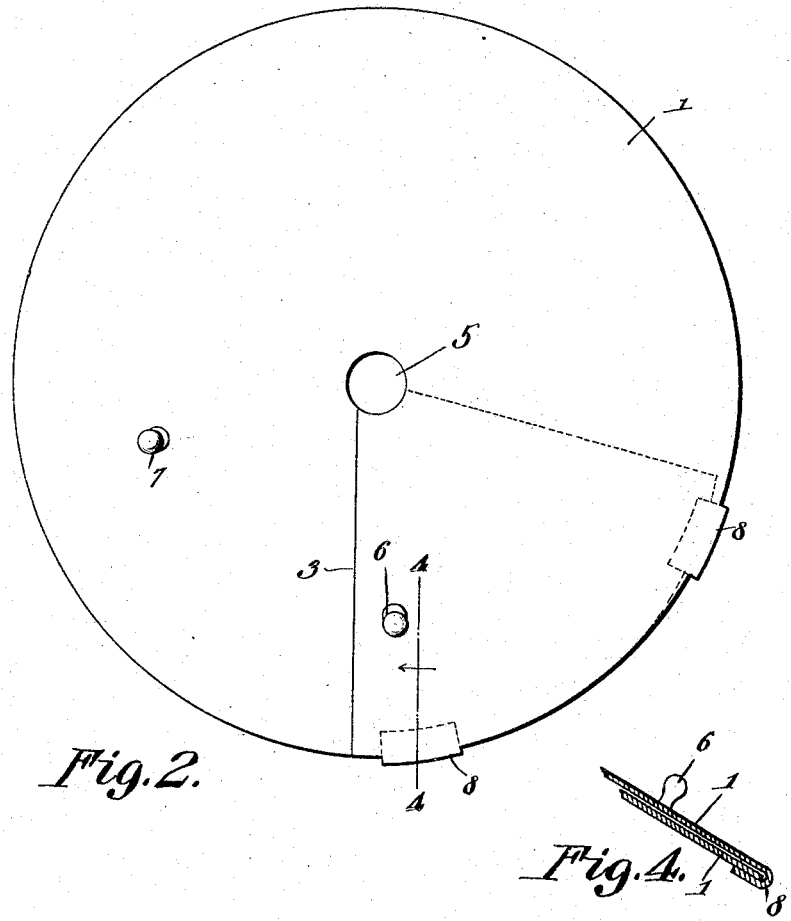
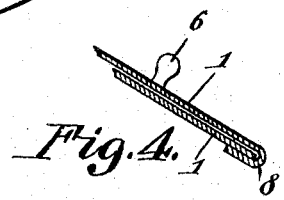
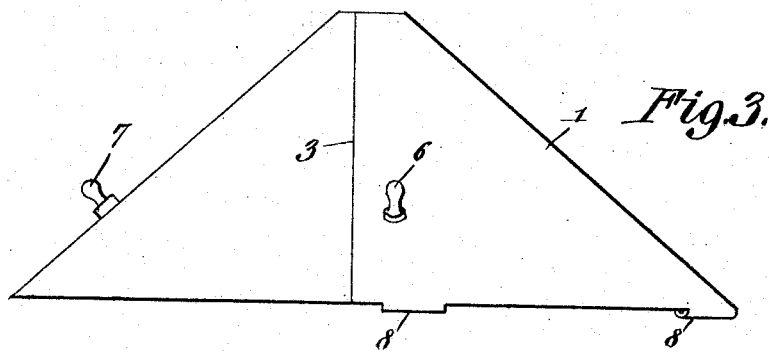

UNITED STATES PATENT OFFICE.

HARRY ELLIS, OF SYRACUSE, NEW YORK.

KETTLE-COVER.

947,098. Specification of Letters Patent. Patented Jan. 18, 1910.

Application filed March 19, 1909. Serial No. 484,395.

*To all whom it may concern:*

Be it known that I, HARRY ELLIS, a citizen of the United States of America, residing at Syracuse, in the county of Onondaga and State of New York, have invented new and useful Improvements in Kettle-Covers, of which the following is a specification.

This invention relates to kettle covers, and one of the principal objects of the invention is to provide a cover which can be expanded or contracted to fit various sizes of kettles.

Another object of the invention is to provide a kettle cover of frusto-conical form having an opening in the top thereof at the center to permit the escape of a small quantity of steam, the frusto-conical form of the cover serving to convey the steam toward the center of the kettle to prevent boiling over.

Still another object of the invention is to provide a kettle cover of substantially funnel shape, said cover being expansible and contractible and adapted to be used as a funnel whenever required for such purpose.

These and other objects may be attained by means of the construction illustrated in the accompanying drawings, in which,—

Figure 1 is a plan view of the blank from which the cover is formed, said blank having the operating knobs secured thereto and the guiding ears extending outward from the lower edge of the blank before said ears are folded. Fig. 2 is a plan view of the cover adjusted in position for use. Fig. 3 is a side elevation of the same. Fig. 4 is a detail sectional view taken on the line 4—4 of Fig. 2, and looking in the direction indicated by the arrow. Fig. 5 is a detail view illustrating the means for holding the cover in adjusted position.

Referring to the drawing, the numeral 1 designates the kettle cover preferably formed of sheet metal like aluminum or tin of the required gage. The blank from which the cover is cut is in the form of a segment of a circle, as shown in Fig. 1, and provided with the terminal edges 2, 3, said blank having its central portion cut away on the arc of a circle, as at 4, to form an opening 5 in the cover, said opening being adjustable as to size when the cover is adjusted. Secured near the edge 3 is a knob 6, while on the body of the cover is a similar knob 7, one of which is adjacent to the opening 5 formed therein. Ears 8 extend outwardly from the periphery of the cover, said ears adapted to be bent around the lower edge of the body portion of the cover, as shown in Fig. 4 of the drawing.

The operation of my kettle cover may be briefly described as follows: When it is desired to expand the cover for a large size kettle, the knobs 6 and 7 are grasped, and the cover is extended so that the edge 3 will overlap the edge 2 but a slight distance. When it is required to use the cover for a smaller kettle the two knobs 6 and 7 are brought together, this action also serving to contract the opening 5. When in use as a cover the steam is directed toward the center and out through the opening 5, and thus the kettle is prevented from boiling over.

Referring to Fig. 5, it will be seen that the knob $6^a$ extends through the body portion 1 of the cover to bear upon the underlying portion of the cover to hold the parts in adjusted position. This construction may be resorted to when the material of which the cover is made is slightly elastic, and further by the use of said screw the overlapping sections of the cover can be separated any distance for the further escape of steam when required as clearly shown in Fig. 5.

My kettle cover may be readily placed within the kettle if desired, or may be placed on the upper edge of the kettle.

When the device is adapted to be used as a funnel, the opening 5 is adjusted to the required size by bringing the knobs 6 and 7 together.

From the foregoing, it will be obvious that a kettle cover made of aluminum or some other flexible material may be readily adjusted to any required size and will remain in adjusted position without extraneous means for holding the parts together.

One of the principal objects of my cover resides in the fact that it may be readily opened out for cleaning and may be supported flat upon a table and cleaned upon both sides. Moreover, the cover can be quickly adjusted to any required size and will not permit the kettle to boil over, a small quantity of steam being permitted to escape at the top.

The cover may be manufactured at slight cost and has the advantage that it may be used for a funnel whenever required.

I claim:—

The herein described kettle cover formed from a single sheet of flexible material, said cover having a central opening and a slot leading from said opening to the outer edge of the cover, one portion of said cover being extended beyond the other and provided with guide ears on the edge thereof to slide upon the edge of the opposite portion of the cover, knobs connected to the cover for adjusting the same to different sizes of kettles, one knob of which is screw threaded and adapted to bear upon the overlapping portion of the cover for holding and adjustably separating said overlapping portions of the cover, as and for the purpose described.

In testimony whereof I affix my signature in presence of two witnesses.

HARRY ELLIS.

Witnesses:
   HAROLD WHITE,
   DELLA ELLIS.